(12) United States Patent
Takagi et al.

(10) Patent No.: US 7,716,706 B2
(45) Date of Patent: *May 11, 2010

(54) DIGITAL TELEVISION BROADCAST SIGNAL RECEIVER

(75) Inventors: Toshihiro Takagi, Daito (JP); Yoshihisa Nagamura, Daito (JP); Yasuhiro Inui, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1320 days.

This patent is subject to a terminal disclaimer.

(21) Appl. No.: 11/167,138

(22) Filed: Jun. 28, 2005

(65) Prior Publication Data

US 2005/0289607 A1 Dec. 29, 2005

(30) Foreign Application Priority Data

Jun. 28, 2004 (JP) ............................. 2004-189974

(51) Int. Cl.
*H04N 7/20* (2006.01)
*H04N 5/50* (2006.01)
*H04B 17/00* (2006.01)

(52) U.S. Cl. ...................... 725/72; 725/68; 348/732; 455/226.1

(58) Field of Classification Search ................ 725/72, 725/136, 151; 348/732; 455/506, 226.1, 455/226.2, 226.3
See application file for complete search history.

(56) References Cited

U.S. PATENT DOCUMENTS

| | | | |
|---|---|---|---|
| 5,300,935 A | | 4/1994 | Yu |
| 5,797,083 A * | | 8/1998 | Anderson ................ 455/25 |
| 6,509,934 B1 * | | 1/2003 | Bao et al. ................ 348/570 |
| 6,721,550 B1 * | | 4/2004 | Okada et al. ............ 455/277.1 |
| 6,774,863 B2 | | 8/2004 | Shirosaka et al. |
| 7,136,113 B2 * | | 11/2006 | Lee ........................ 348/725 |
| 7,460,834 B2 * | | 12/2008 | Johnson et al. ........... 455/63.4 |
| 2002/0036718 A1 * | | 3/2002 | Lee ........................ 348/731 |
| 2003/0228857 A1 * | | 12/2003 | Maeki .................... 455/278.1 |
| 2005/0108759 A1 * | | 5/2005 | Arsenault et al. ......... 725/72 |

FOREIGN PATENT DOCUMENTS

JP 05-267919 A 10/1993

(Continued)

OTHER PUBLICATIONS

Japanese Office Action dated Mar. 18, 2008 with English translation (Four (4) pages).

*Primary Examiner*—Brian T Pendleton
*Assistant Examiner*—Pinkal Chokshi
(74) *Attorney, Agent, or Firm*—Crowell & Moring LLP

(57) ABSTRACT

A multi-directional antenna connected with a digital television broadcast signal receiver is arranged not to move one full turn instantaneously in response to an abrupt drop down in the intensity of a received signal thus to avoid any downward overshooting of the intensity of the received signal and eliminate any useless direction searching time while remains favorably controlled to face in the direction where the intensity of the received signal is at optimum. More specifically, the maximum of the intensity of a received signal at each channel is measured and the threshold is set to a level lower than the maximum. When the intensity of a received signal has dropped down from the threshold, the antenna remains not turned within a predetermined period of marginal time. The antenna is moved one full turn only when the intensity drops down from the threshold and stays continuously over the predetermined period of marginal time. Then, the maximum of the intensity of the received signal is modified and stored for future use.

2 Claims, 6 Drawing Sheets

FOREIGN PATENT DOCUMENTS

| | | | |
|---|---|---|---|
| JP | 06-225230 A | | 8/1994 |
| JP | 9-321517 A | | 12/1997 |
| JP | 09321517 A | * | 12/1997 |
| JP | 2003-344517 A | | 12/2003 |
| JP | 2004-15800 A | | 1/2004 |
| JP | 2004-173062 A | | 6/2004 |

* cited by examiner

DIGITAL TELEVISION BROADCAST SIGNAL RECEIVER

BACKGROUND OF THE INVENTION

1. Field of the Invention

The present invention relates to a digital television broadcast signal receiver for receiving a digital television broadcast signal, e.g., of ATSC format.

2. Description of the Related Art

In the North America, ATSC digital television broadcasting services (referred to as TV broadcast hereinafter) are widely provided from their stations, commonly located at large cities or their suburbs in the plains and their TV broadcast signals are hence received from all directions by each user who has to inevitably direct its antenna towards the stations transmitting TV broadcast signals of desired TV programs. For compensation, there have been developed and nearly marketed a number of multi-directional antennas including smart antenna. One of the most known antennas for receiving ground television broadcast signals is Yagi antennas. In particular, Yagi antennas are highly directional and can thus receive as low signals as possible. However, as Yagi antennas are highly directional, they may receive only the signals from a small group of stations. Also, Yagi antennas may vary largely in the intensity of a received signal as they are shifted from one direction to another.

There have been introduced some techniques for controlling the receiving direction of an antenna; a method of determining the optimum receiving condition of an antenna with the use of a sensor which measures the angle of turning of the antenna (Japanese Patent Laid-open Publication 05-267919), a method of controllably turning an antenna, e.g., vehicle-loaded satellite broadcast signal receiving antenna, through providing a driving signal and a directional signal in response to the level of an received signal (Japanese Patent Laid-open Publication 06-225230), and a method of modifying the turning speed of an antenna, e.g., vehicle-loaded satellite broadcast signal receiving antenna, in response to a change in the intensity of a received signal (Japanese Patent Laid-open Publication 2003-344517).

As described above, a multi-directional antenna (such as smart antenna) is preferable for receiving a plurality of aerial signals of the ATSC digital television broadcast service which are radiated from different directions. The EIA-909 standard determines that the receiving direction of smart antennas shall respond to each of directions determined through dividing the full circle by 16. A digital television broadcast signal receiver is thus arranged for receiving TV broadcast signals from all the sixteen discrete directions with its multi-directional antenna positioning control as conforming to the EIA-909 standard.

Some of digital television broadcast signal receivers (referred to as digital TV signal receivers hereinafter) are equipped with an auto scan function for selecting the receiving direction of an antenna in which the TV signal at a user-desired channel is received at optimum. As the antenna or transmitter tower of a broadcast station is not movable, the direction in which the received signal is at optimum can be predetermined through scanning the sixteen directions at each channel. However, In the U.S.A., a plurality of new broadcast stations are established with comparatively easiness while some of the existing broadcast stations are eliminated. Hence, there may frequently happen that the existing channel is suddenly lost while new channels are introduced. Also, a high skyscraper is built at the neighbor area and will interrupt the reception of TV broadcast signals. This requires the user to reset the direction of the antenna in which the TV signal at each channel is received at optimum. Even when the digital TV broadcast signal receiver equipped with an auto scan function is connected with a multi-directional antenna arranged for minimizing the time required for resetting the receiving direction of the antenna, the interval between outputs of the control signal for modifying the direction of the antenna is not short, thus increasing the time required for determining the direction in which the TV signal at each channel is received at optimum and irritating the user.

When the antenna installed in a room is interrupted by someone walking across its direction, its received signal intensity may temporarily drop down. Also, any flying object, such as a helicopter, flying low may interrupt the signal reception of the antenna in a moment and lowers the intensity of the received signal. The smart antenna is arranged for constantly operating a turning movement to search the direction in which the signal is received at optimum and can quickly respond to any drop down in the intensity of the received signal to shift back the intensity to its original level. However, when the intensity of the received signal has been returned back to its original level instantaneously in response to the drop down, the antenna operates its full turn and temporarily faces another direction as dislocated from the direction where the received signal is at optimum. As the intensity of the received signal is downwardly overshot (See FIG. 7), the reproduction of a TV image from the received signal will be interrupted. It is hence needed for compensating the overshooting to operate the antenna again and thus waste another time and energy.

SUMMARY OF THE INVENTION

The present invention has been developed in view of the above aspect and its object is to provide a digital television broadcast signal receiver arranged capable of readily controlling the movement of a multi-directional antenna and determining the direction where the signal of interest is received at optimum while inhibiting useless turning movement of the antenna and minimize the number of scanning actions and the time required for searching the signal at a desired channel so that the optimum signal receiving condition can be obtained and maintained.

An aspect of the present invention provides a digital television broadcast signal receiver to be connected with a multi-directional antenna having multiple receiving directions as specified by an applicable standard and thus arranged to receive a television broadcast signal from one of the multiple directions which has selectively been enabled, comprising: a receiving direction control signal output unit for supplying the multi-directional antenna with a control signal to determine the direction in which a television broadcast signal is received; a tuner to be connected to the multi-directional antenna for receiving the television broadcast signal; a broadcast signal processing unit for subjecting the television broadcast signal received by the tuner to predetermined processing actions; a image signal output unit for supplying a monitor with a processed signal produced by the broadcast signal processing unit; a memory in which the processed signal produced by the broadcast signal processing unit is temporarily stored; a receiving direction determining unit for determining from the processed signal stored in the memory a direction in which a television broadcast signal at each channel is received at optimum; and a main controller for controlling an action of each component of the digital television broadcast signal receiver, wherein the receiving direction control signal output unit is arranged for sending the control signal to the multi-directional antenna at given intervals of time so that the multi-directional antenna is sequentially turned in the multiple directions, the tuner is arranged for measuring an intensity of a received television broadcast signal at each channel, and determining and storing in the memory, the measured intensity of the television broadcast signal received from each of the multiple directions, a direction in which a television broadcast signal at the each channel is received at optimum, a maximum of the intensity of the received signal, and a threshold of the intensity of the received signal which is set to a level lower than the maximum of the intensity of the received signal and used for starting turning movement of the multi-directional antenna, the receiving direction control signal output unit includes a receiving direction control unit for, when detecting that an intensity of a received signal at a channel being tuned drops down from the threshold for the channel that is stored in the memory, controllably modifying the receiving direction of the multi-directional antenna, and the receiving direction control signal output unit keeps the multi-directional antenna not turned for modifying the receiving direction for a predetermined period of marginal time after the intensity of the received signal at the channel has dropped down from the threshold stored in the memory.

According to the aspect of the present invention, the threshold is determined from the intensity of the received signal and used for controlling the searching movement of the antenna when the intensity of the received signal is declined. Also, the predetermined period of marginal time (weak attack delay) is provided before the startup of movement of the multi-directional antenna for modifying the receiving direction to restore the intensity of the received signal. This allows the antenna to respond not instantaneously to an abrupt drop down in the intensity of the received signal which may be caused by someone walking across when the antenna has been installed in a room but remain intact in the direction. Accordingly, when the intensity of the received signal has been returned back to its original level, the signal receiving condition of the antenna can be maintained at consistency. As a result, useless time and energy needed for conducting one full turn movement of the antenna will be avoided while the restoration of the received signal is carried out without delay.

Preferably, the receiving direction control signal output unit keeps the multi-directional antenna not turned for modifying the receiving direction for the predetermined period of marginal time after the intensity of the received signal at the channel has dropped down from the threshold stored in the memory, and controls the receiving direction control unit to fully turn the multi-directional antennal only when the intensity of the received signal at the channel stays continuously below the threshold stored in the memory over the predetermined period of marginal time, and when the intensity of the received signal returns back to a desired level for permitting reproduction of an image from the signal after the one full turn, the receiving direction control signal output unit updates the direction in which the television broadcast signal is received at optimum and the maximum of the intensity of the received signal while modifying the threshold to a level determined from the updated maximum of the intensity for storage in the memory, and then, whenever the intensity of the received signal at the channel drops down from the threshold and stays continuously below the threshold stored over the predetermined period of marginal time, the receiving direction control signal output unit controls the receiving direction control unit to fully turn the multi-directional antenna after the predetermined period of marginal time, and updates the direction in which the television broadcast signal is received at optimum, the maximum of the intensity of the received signal, and the threshold determined from the maximum of the intensity for storage in the memory, and when the intensity of the received signal at the channel fails to return back to a desired level for permitting reproduction of an image from the signal, the receiving direction control signal output unit does not update the direction in which the television broadcast signal is received at optimum and the maximum of the intensity of the received signal.

In this configuration, when the intensity of the received signal drops down from the threshold during the TV signal receiving action, the maximum of the intensity of the receive signal, the direction in which the signal is received at optimum, and the threshold for the intensity of the received signal are modified and updated. More specifically, the resetting of the receiving direction of the multi-directional antenna can be repeated as desired whenever the intensity of the received signal is changed. As a result, the TV signal can be received at optimum at each timing, hence allowing the reproduction of a TV image at high quality from the received signal.

Preferably, the predetermined period of marginal time and the threshold can be modified.

In this configuration, both the predetermined period of marginal time (weak attack delay) for delaying the start of movement of the antenna and the threshold used for determining whether the turning movement of the antenna is commenced or not are arranged variable. As a result, the action of the antenna can respond quickly to any change with the period of marginal time set to a shorter length or with the threshold set to a greater level when the signal receiving condition remains favorable. The signal receiving condition of the antenna can readily be modified with freedom depending on the environmental states.

DESCRIPTION OF THE PREFERRED EMBODIMENTS

Figure 1:
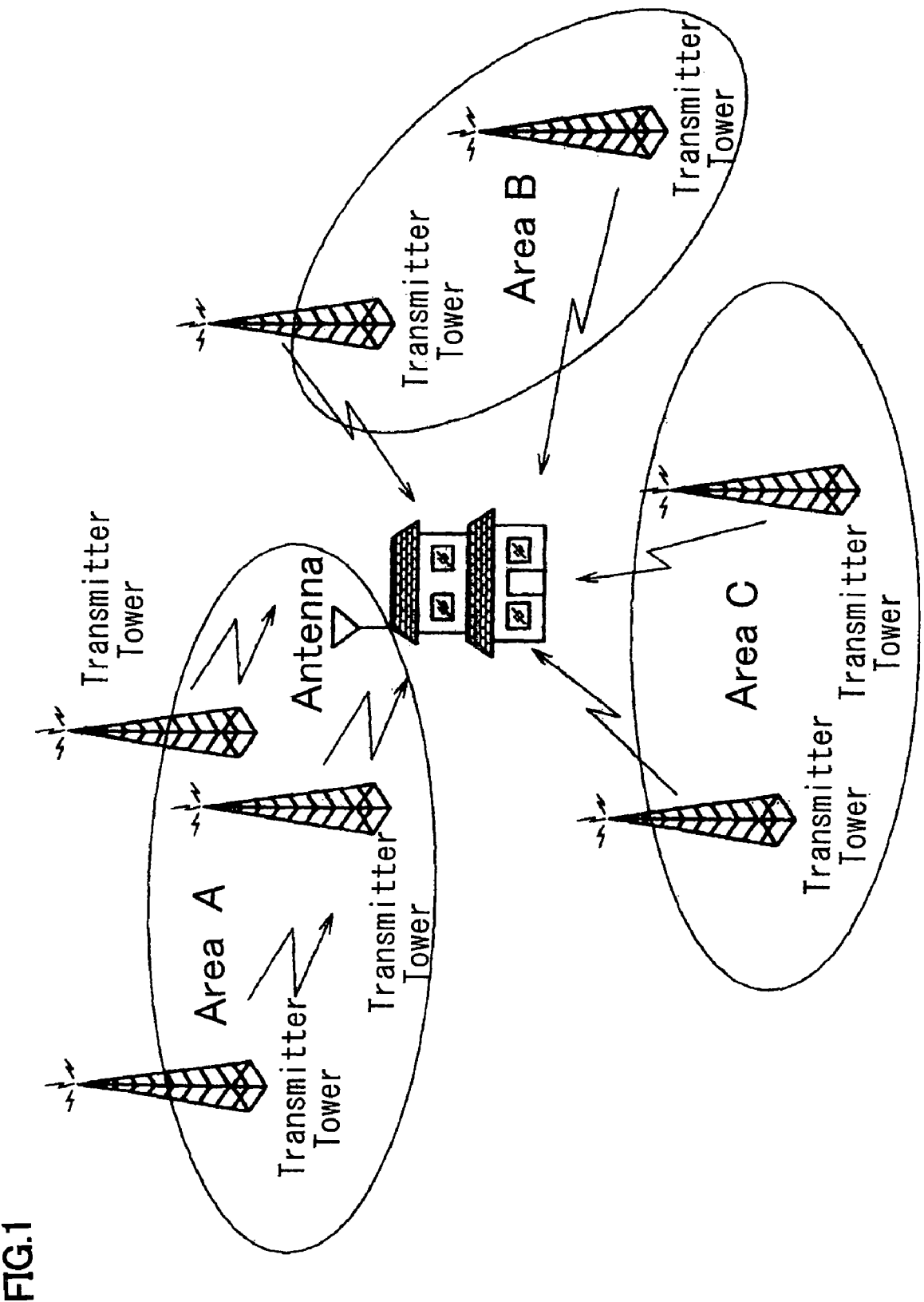
FIG. 1 is a schematic view showing a user at home receiving digital TV broadcast signals.

A digital TV broadcast signal receiver according to one embodiment of the present invention will be described in more detail referring to the relevant drawings. FIG. 1 illustrates the reception of a TV broadcast signal by a user at home. In a local area where a digital (ground) TV broadcast service is provided, the digital TV signal from the service is successfully converted through signal correction into an image at a given quality when its intensity is higher than a certain threshold. Accordingly, some TV programs from the TV signals received from different stations in such A, B, and C areas as shown in FIG. 1 can be viewed. This requires the use of a multi-directional antenna or smart antenna for receiving the TV signals from different directions.

The digital TV broadcast signal receiver may be arranged for receiving analog TV broadcast signals as well as the digital TV broadcast signals while conducting a direction controlling action for determining the optimum reception of the signals at high efficiency through confirming the number of signal receiving directions of its multi-directional antenna. It is now noted that the term of TV signals is used when discrimination is not needed between the digital TV signal and the analog TV signal.

The digital TV broadcast signal receiver conforming to the EIA-909 standard should be capable of switching between all the sixteen directions regardless of the types of a multi-directional antenna to be connected or the number of directions to be assigned.

The digital TV broadcast signal receiver of this embodiment is arranged to, when connected to a multi-directional antenna, receive the TV signal from all the sixteen directions determined by the standard and measure the intensity of the TV signal. As the optimum direction where the intensity of the TV signal was maximum is stored for each channel, the multi-directional antenna can be shifted to the optimum direction upon selection of the channel.

Figure 2:
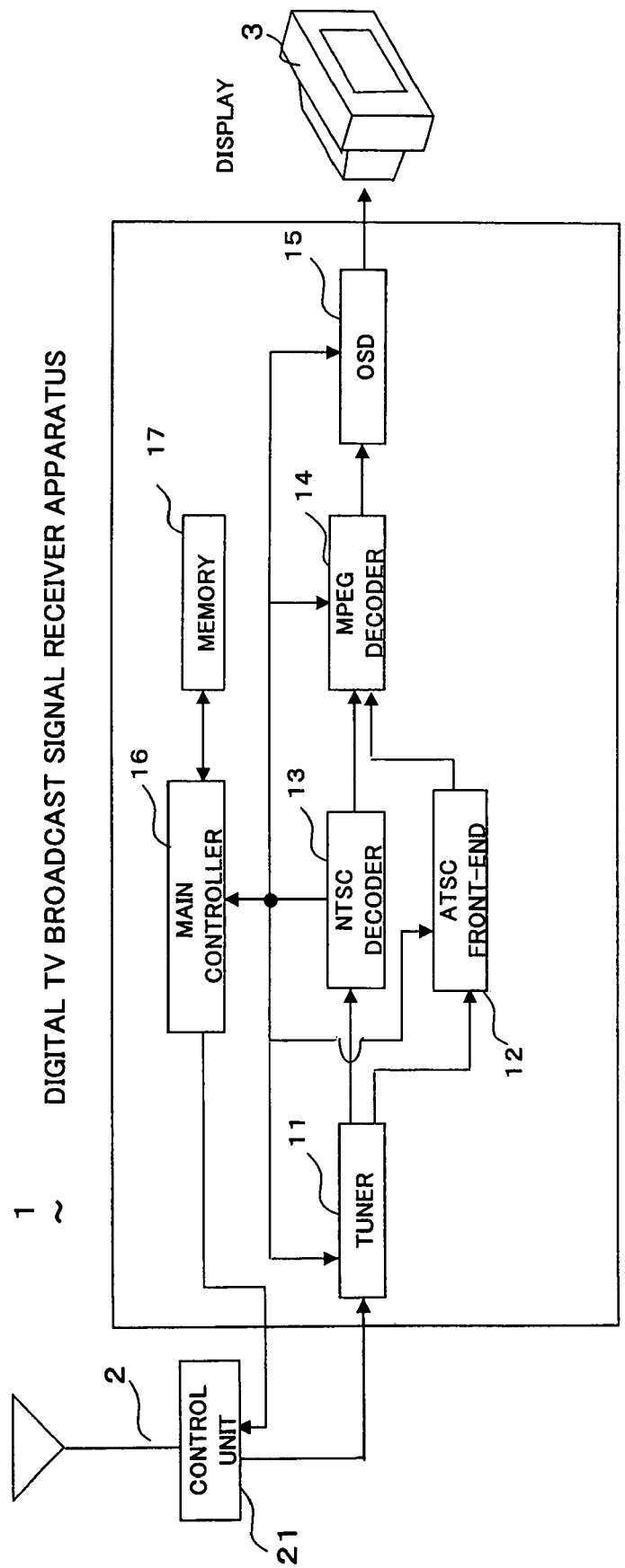
FIG. 2 is an electrical block diagram of a digital TV broadcast signal receiver showing one embodiment of the present invention.

FIG. 2 illustrates an arrangement of the digital TV broadcast signal receiver 1 of the embodiment. As connected with a multi-directional antenna 2, the digital TV broadcast signal receiver 1 comprises a tuner 11 for receiving TV broadcast signals, an ATSC front-end (broadcast signal processing unit) 12 for processing and decoding a digital TV broadcast signal received by the tuner 11, an NTSC decoder (broadcast signal processing unit) 13 for decoding an analog TV broadcast signal received by the tuner 11, an MPEG decoder (image signal output unit) 14 for decoding the TV broadcast signal of an MPEG compressed form, an on-screen display (OSD) 15 for superimposing predetermined display image data on the decoded TV broadcast signal, a main controller (CPU) 16 for commanding the tuner 11 to measure the intensity of the TV broadcast signal received by the tuner 11, determining the action of a control unit 21 for driving the multi-directional antenna 2, and controlling the actions of the ATSC front-end 12 and the NTSC decoder 13, and a memory 17 for temporarily storing the decoded TV signal while storing the display image data to be superimposed on the TV broadcast signal. The TV broadcast signal decoded by the MPEG decoder 14 is transferred via the on-screen display (image signal output unit) 15 to the monitor 3 for display. The ATSC front end 12, the NTSC decoder 13, and the MPEG decoder 14 are combined to construct substantially a broadcast signal processing unit of the embodiment. More specifically, the main controller 16 functions as an antenna direction decision and receiving direction control signal output unit in addition to an entire controller for controlling entirely the action of the components including the broadcast signal processing unit. The receiving direction control signal output unit includes a receiving direction control unit. Generally in the digital TV broadcast service, the digital TV broadcast signal receiver 1 is enabled to transfer a data from its user to the station. However, its action is not related to the present invention and will be explained in no more detail.

The control unit 21 for the multi-directional antenna 2 is actuated by a control signal from the main controller 16 to conduct the multi-directional antenna 2 and selectively enable desired one of the directions of the multi-directional antenna 2. When the multi-directional antenna 2 is of a motor driven type for determining the direction, the control unit 21 controls the rotation of a motor to set the antenna in a desired direction. When the multi-directional antenna 2 is of another type for determining the direction of the antenna by switching on and off, a group of electronic switches, the control unit 21 switches the electronic switch on in a desired direction and the other switches off.

Figure 3:
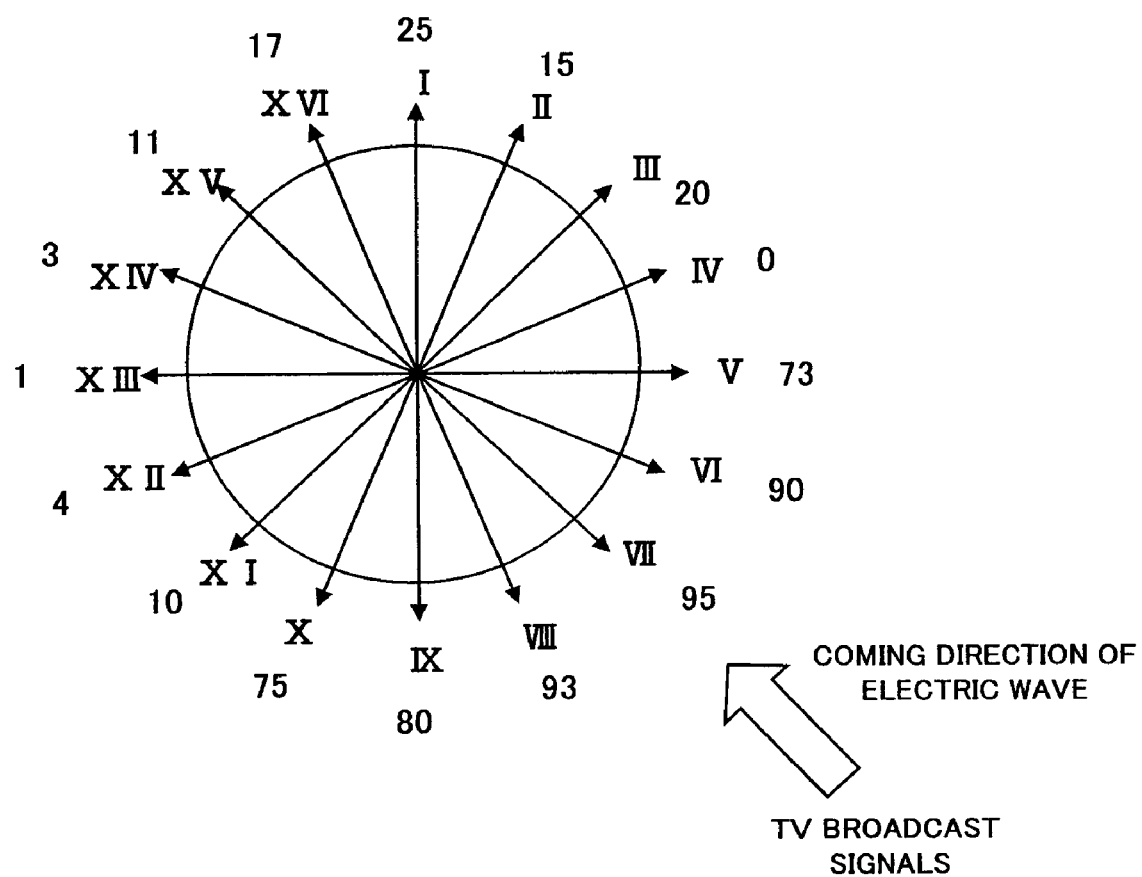
FIG. 3 illustrates a pattern of receiving the TV signal.
Figure 4A:
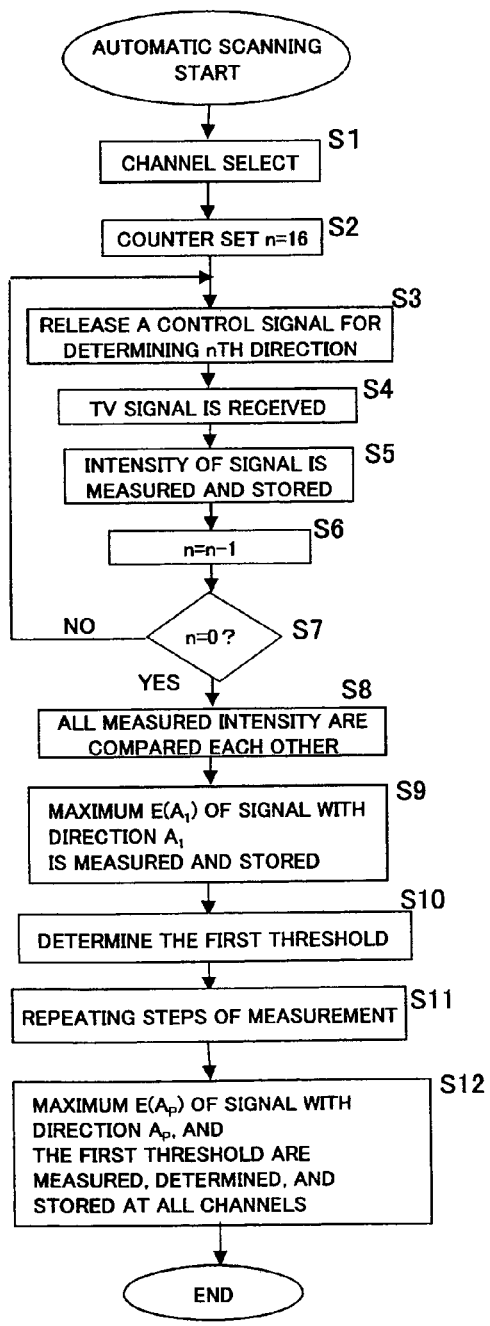
FIGS. 4a and 4b illustrate a flowchart showing an auto scan action of the digital TV broadcast signal receiver.

FIG. 3 illustrates an exemplary pattern of the TV signal reception of the multi-directional antenna 2 having sixteen directions defined by the EIA-909 standard. The sixteen directions defined by the EIA-909 standard are denoted by I to XVI in FIG. 3 while the Arabic figures representing different levels of the intensity of the received signal at a certain channel in the direction. The action of the main controller 16 controlling the setting of the multi-directional antenna 2 in the digital TV broadcast signal receiver 1 will now be described referring to flowcharts shown in FIGS. 4a and 4b. As shown in FIG. 4a, the action starts with the main controller 16 detecting that the tuner 11 is connected with the multi-directional antenna 2 and starts its automatic scanning action. When a desired channel is selected (S1), the main controller 16 sets the counter with n=16 (S2) and releases a control signal for determining the nth direction (S3). The control signal is received by the control unit 21 for driving the multi-directional antenna 2. When a period of time required for setting the direction of the multi-directional antenna 2 has elapsed, the TV signal at the desired channel is received by the tuner 11 (S4). As the TV signal is received, its intensity is measured under the control of the main controller 16 and the measurement is stored in the memory 17 (S5). Then, the counter is decremented by one (S6) before it is examined whether or not the intensity of the digital TV signal is measured in all the sixteen directions (S7). When the measurement of the intensity of the digital TV signal in all the sixteen directions is not completed, the action returns back to Step S3 for measuring the intensity of the digital TV signal in the remaining directions.

When the intensity of the digital TV signal has been measured in all the sixteen directions (yes at S7), the main controller 16 reads out the measurements from the memory 17 and compares them from each other (S8). The maximum E(A1) of the TV signal intensity at the desired channel is specified together with the direction A1 where the maximum E(A1) of the intensity of the TV signal is measured and both, E(A1) and A1, are stored (S9). The main controller 16 then determines the first threshold from the TV signal intensity E(A1) for storage (S10) before switching the channel to another (S11) and repeating the steps for measuring the intensity of the received TV signal. The maximum E(Ap) of the TV signal intensity, the direction Ap where the maximum intensity E(Ap) is measured, and the first threshold Eth(Ap) (P being a given channel number) are determined and stored in the memory 17 (S12).

Figure 4B:
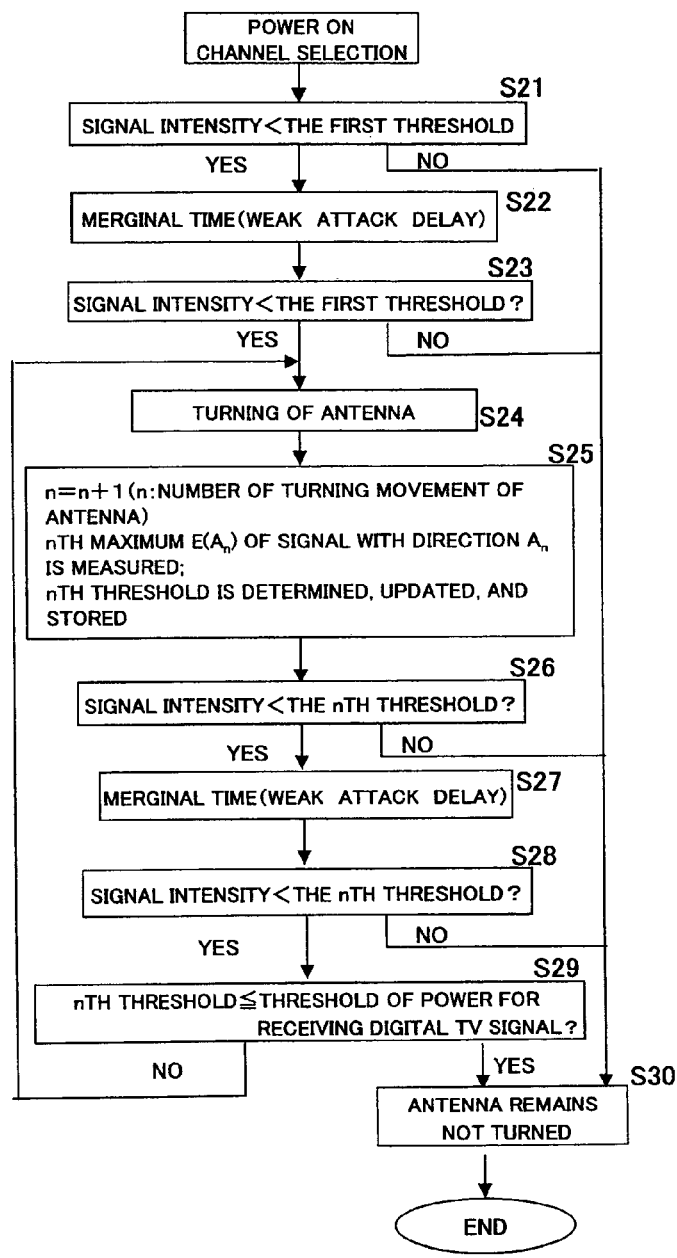

The action of controlling the setting of the multi-directional antenna 2 with the maximum E(Ap) of the TV signal intensity, the direction Ap where the maximum intensity E(Ap), and the first threshold Eth(Ap) having been determined at all the channels as shown in FIG. 4a will be described referring to the flowchart of FIG. 4b. When the intensity of the received signal declines to a level lower than the first threshold at a selected channel (S21) the main controller 16 continues the intensity measuring action. When, after a predetermined period of marginal time (weak attack delay) from the declination of the received signal intensity (S22), the main controller 16 finds that the intensity of the received signal remains lower than the first threshold (S23), it releases a control signal for fully turning the multi-directional antenna 2 to search one direction where the maximum of the received signal is measured (S24). When the intensity of the received signal measured is higher than a reference level for reproducing a legible image from the received signal, the main controller 16 updates the measurement of the received signal intensity and the direction of the antenna stored in the memory (S25). This allows the TV signal at a desired channel to be received at its optimum intensity. Also, the foregoing action for updating the measurement of the received signal intensity and shifting the nth threshold to a new setting can be repeated whenever any change in the intensity of the received signal is detected. Accordingly, if the intensity of the received signal is declined further, the action stands by for the period of marginal time (weak attack delay) (S27) and compares the intensity with the nth threshold (S26, S28) for improvement of the signal reception. Because the multi-directional antenna 2 is repeatedly turned for improving the intensity of the received signal, its resultant reproduced image can be enhanced in the quality. When the nth threshold is not higher than a threshold of the power for receiving the digital TV signal (yes at S29), the signal reception will hardly be conducted at a desired level of the intensity. Then, the turning of the multi-directional antenna 2 is canceled and no more action is carried out for updating the received signal intensity, the direction, and the threshold. When it is judged no at each of Steps S21, S23, S26, and S28 in the flowchart shown in FIG. 4b, the intensity of the received signal is higher than the corresponding threshold and the turning of the multi-directional or smart antenna is not required (S30).

Figure 5:
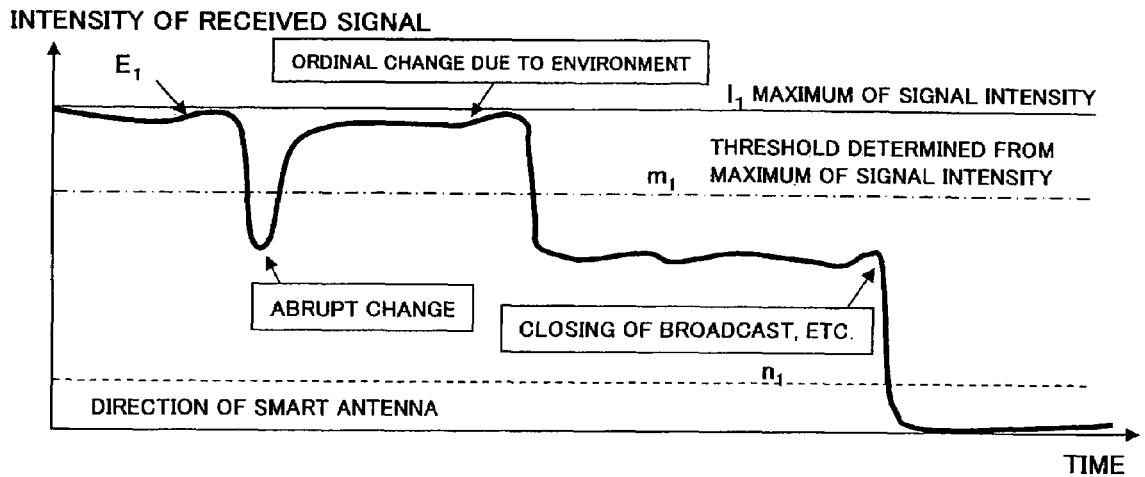
FIG. 5 is a characteristic diagram showing a change in the intensity of the received signal with no use of the algorithm according to the present invention.
Figure 6:
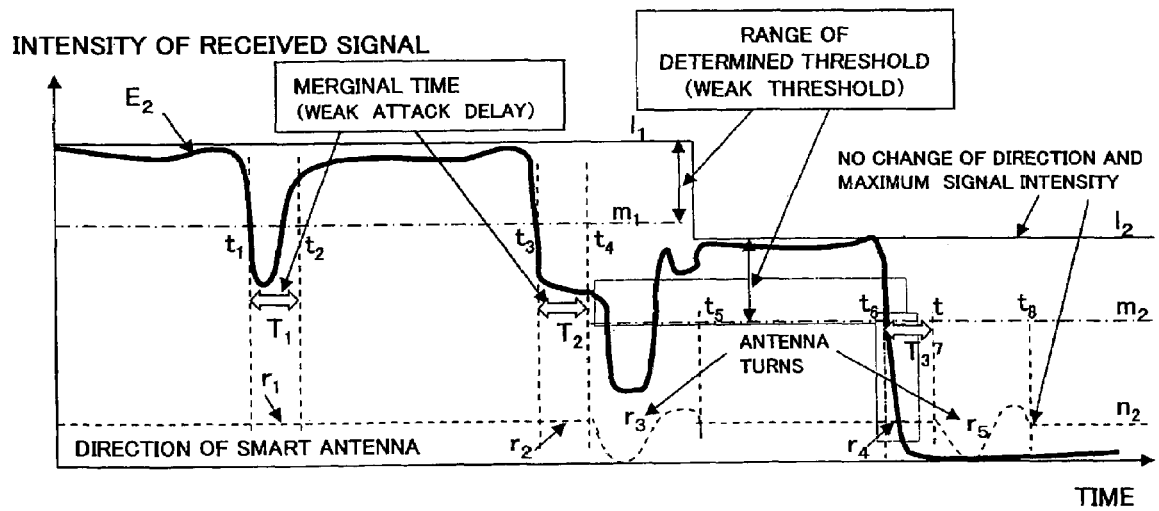
FIG. 6 is a characteristic diagram showing a change in the intensity of the received signal with the use of the algorithm.
Figure 7:
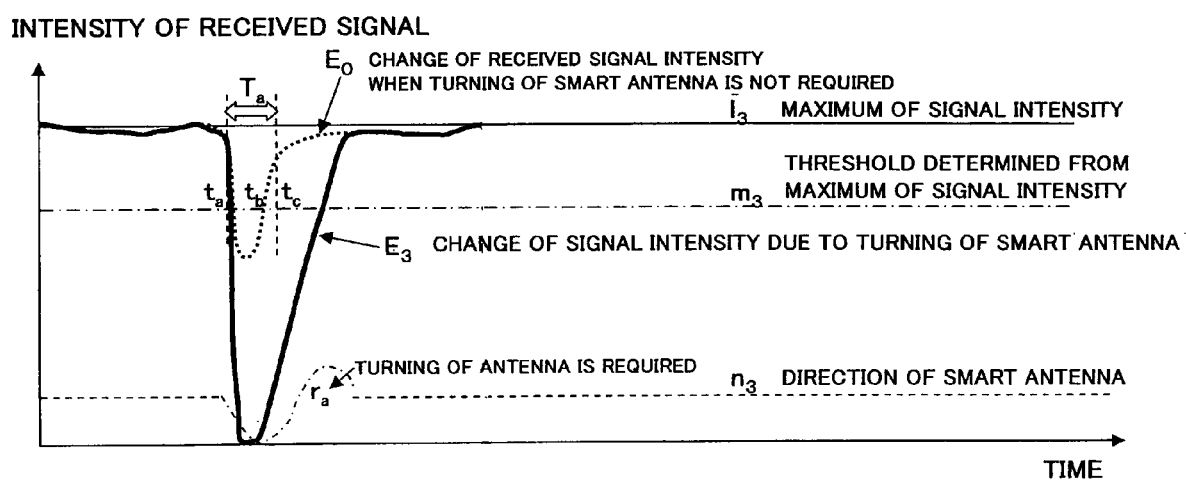
FIG. 7 is a characteristic diagram showing a change in the intensity of a received signal with and without the use of the algorithm when the change lasts short.

FIGS. 5, 6, and 7 illustrate profiles of the received signal intensity varying with or without the use of an algorithm of the present invention.

FIG. 5 is a profile of the intensity of the received signal at one certain TV channel with time. The intensity of the received signal is equivalent to that in one direction while the smart antenna remains not turned for searching the station and is steadily varied with a stationary change in the environment, e.g., caused by someone walking across the antenna. Accordingly, the algorithm is not involved. In FIG. 5, the vertical axis represents the intensity of the received signal and the horizontal axis represents the time. Denoted by I1 is the maximum of the signal intensity E1, m1 is the threshold determined from the maximum I1, and n1 is the reference level determined for ease of the description of a change in the intensity along the vertical axis. In FIG. 5, since the smart antenna remains not turned and the algorithm is not used, the reference level n1 extends linearly with no significant change.

FIG. 6 is a profile of the intensity E2 of the signal which is received with the smart antenna as modified with the help of the algorithm, similar to the intensity E1 of the received signal shown in FIG. 5. In FIG. 6, the vertical axis represents the intensity of the received signal and the horizontal axis represents the time. Denoted by I1, m1 and I2, m2 are the maximum of the signal intensity E2 and the threshold determined from the maximum before and after the modification respectively. Denoted by n2 is the reference level determined for ease of the description of a change in the intensity along the vertical axis. With the algorithm used in FIG. 6, when the smart antenna is moved one full turn, the reference level n2 changes up and down along the vertical axis as denoted by r3 and r5. Even when the intensity E2 temporarily drops down from the threshold m1, the antenna is inhibited from turning by the effect of the period of marginal time (weak attack delay) and hence the reference level n2 remains linearly as denoted by r1, r2, and r4.

When the received signal shown in FIG. 6 is abruptly changed, its intensity E2 drops down from the threshold m1 at the time t1. Since the period of marginal time T1 (weak attack delay) is assigned, the smart antenna remains not turned from t1 to t2 during which the intensity E2 returns back across the threshold m1, to substantially its original level. Accordingly, the turning of the smart antenna will be unnecessary. As will be explained with FIG. 7, any turning movement of the smart antenna shifts the direction of signal reception and may temporarily create a mode of no signal reception.

When the intensity E2 of the received signal drops down again from the threshold m1 at t3 and fails to return back to the threshold m1 after the period of marginal time, T2 from t3 to t4 this time, the smart antenna is then moved one full turn as denoted by r3. The turning action then determines another favorable direction where the intensity E2 is optimum at 12 and the threshold is modified to m2. As the smart antenna is moved one full turn, the intensity of the received signal may temporarily drop down further. However, the intensity E2 of the received signal will be at least higher than the drop of the intensity E1 shown in FIG. 5 once the favorable direction has been found.

When the intensity E2 drops down from the modified threshold m2 throughout the period of marginal time T3 from t6 to t7, the smart antenna is moved one full turn again from t7 to t8. That may result from the fact that the daily broadcast service is closed and no TV signals are available. As a result, the intensity E2 remains at bottom but not returned back by the turning movement of the smart antenna as denoted by r5. Since the intensity E2 remains at bottom, its stored measurement as well as the direction in the memory will not be updated. Accordingly, as the data about the intensity and the direction in the memory remains optimum, it allows the user to readily select a desired TV channel and receive its signal under favorable conditions.

FIG. 7 is a profile of the intensity E3 of the signal of which an abrupt change is compensated by the turning movement of the smart antenna with and without the help of the algorithm. In FIG. 7, the vertical axis represents the intensity of the received signal and the horizontal axis represents the time. Denoted by I3 and m3 are the maximum of the signal intensity E3 and the threshold determined from the maximum respectively. Denoted by n3 is the reference level determined for ease of the description of a change in the intensity along the vertical axis with the turning movement of the smart antenna. When the intensity E3 of the received signal temporarily drops down from the threshold m3 from ta to tb, i.e., its change E0 is highly instantaneous and negligible (as denoted by the dotted line requiring no turning movement of the smart antenna), it is responded by the smart antenna moving one full turn. As the turning movement of the smart antenna never pauses before one full turn, the antenna temporarily faces in other directions than the signal receiving direction thus lowering further the intensity E3 of the received signal and deteriorating the quality of its signal reproduced image. Since the deterioration is not corrected before one full turn of the smart antenna is completed, the duration of time prior to the intensity returning back to its original level will be wasted. When the algorithm is used, the intensity E0 of the received signal returns quickly to its original level above the threshold m3 during the marginal time T0 (from ta to tc). This allows the smart antenna to remain not turned but holding the intensity at E0, thus enabling the reproduction of a normal quality image.

As set forth above, the digital TV broadcast signal receiver according to the present invention has the intensity of the received signal assigned with a desired setting at the maximum and the threshold arranged to a favorable level determined from the maximum of the intensity of the received signal (for example, 3 to 6 dB lower than the maximum of the intensity of the received signal). The threshold is used as a reference level for initiating one full turn movement of the smart antenna when the intensity of the received signal is declined. Also, a period of marginal time (weak attack delay) is provided before the smart antenna is initiated one full turn. When the intensity of the received signal remains lower than the threshold after the period of marginal time, the smart antenna is moved one full turn. In an prior art, when an instantaneous drop in the intensity of the received signal is caused by someone walking across a smart antenna and interrupting the signal receiving action, it is systematically corrected with the smart antenna shifting the direction from its original to another. However, the smart antenna of the prior art remains shifted from the original direction when the intensity of the received signal has successfully been recovered. Using the algorithm of the present invention, each instantaneous change in the intensity of the received signal is not directly responded by the turning movement of the smart antenna. Since the present invention allows the smart antenna to remain in the direction when the intensity of the received signal has been recovered from its change, the reproduction of a TV image from the received signal can be ensured without interruption. Accordingly, as the smart antenna needs not to be moved one full turn restlessly, no wasteful consumption of the time and the energy will be proceeded. The reproduction of TV images from the received signals will be made at consistency, hence discouraging the credibility of no user.

When the intensity of the received signal is declined to a level lower than the threshold predetermined at the initial stage of receiving the TV signals, it is modified and updated together with the direction and the threshold both determined depending on the modified level of the intensity. This allows the direction of the smart antenna to be reset repeatedly as the intensity of the received signal is varied more or less. When the intensity of the received signal is declined; its optimum level is recalculated and maintained for ensuring the reproduction of a TV image at certain quality from the received signal.

The present invention is not limited to the foregoing embodiment but any change or modification may be made without departing from the scope of the present invention. For example, when an instantaneous change in the intensity of the receive signal is frequent, the period of marginal time is increased and the threshold is lowered. This minimizes the turning or searching movement of the smart antenna responding to the change in the intensity of the received signal, hence inhibiting the intensity of the received signal from overshooting downwardly and ensuring the reproduction of a TV image from the received signal without major interference. Alternatively, when the intensity of the received signal is substantially held at a high level, the threshold is increased correspondingly. This allows the smart antenna to respond quickly to any drop down in the intensity of the received signal and to move and search the direction of the signal reception for improving the signal reception. As the startup movement of the smart antenna is arbitrarily controlled by the user depending on the environmental or usage conditions, the signal reception will remain stable thus ensuring the reproduction of a TV image at optimum level from the received signal.

What is claimed is:

1. A digital television broadcast signal receiver to be connected with a multi-directional antenna having multiple receiving directions as specified by an applicable standard and thus arranged to receive a television broadcast signal from one of the multiple directions which has selectively been enabled, comprising:
   a receiving direction control signal output unit for supplying the multi-directional antenna with a control signal to determine the direction in which a television broadcast signal is received;
   a tuner to be connected to the multidirectional antenna for receiving the television broadcast signal;
   a broadcast signal processing unit for subjecting the television broadcast signal received by the tuner to predetermined processing actions;
   a image signal output unit for supplying a monitor with a processed signal produced by the broadcast signal processing unit;
   a memory in which the processed signal produced by the broadcast signal processing unit is temporarily stored;
   a receiving direction determining unit for determining from the processed signal stored in the memory a direction in which a television broadcast signal at each channel is received at optimum; and
   a main controller for controlling an action of each component of the digital television broadcast signal receiver,
   wherein
   the receiving direction control signal output unit is arranged for sending the control signal to the multi-directional antenna at given intervals of time so that the multi-directional antenna is sequentially turned in the multiple directions,
   the tuner is arranged for measuring an intensity of a received television broadcast signal at each channel, and determining and storing in the memory, the measured intensity of the, television broadcast signal received from each of the multiple directions, a direction in which a television broadcast signal at the each channel is received at optimum, a maximum of the intensity of the received signal, and a threshold of the intensity of the received signal which is set to a level lower than the maximum of the intensity of the received signal and used for starting turning movement of the multi-directional antenna, the receiving direction control signal output unit includes a receiving direction control unit for, when detecting that an intensity of a received signal at a channel being tuned drops down from the threshold for the channel that is stored in the memory, controllably modifying the receiving direction of the multi-directional antenna, and
   the receiving direction control signal output unit keeps the multi-directional antenna not turned for modifying the receiving direction for a predetermined period of marginal time after the intensity of the received signal at the channel has dropped down from the threshold stored in the memory,
   the predetermined period of marginal time and the threshold are variable, depending upon a condition of the received signal.

2. The digital television broadcast signal receiver according to claim 1, wherein
   the receiving direction control signal output unit keeps the multi-directional antenna not turned for modifying the receiving direction for the predetermined period of marginal time after the intensity of the received signal at the channel has dropped down from the threshold stored in the memory, and controls the receiving direction control unit to fully turn the multi-directional antenna only when the intensity of the received signal at the channel stays continuously below the threshold stored in the memory over the predetermined period of marginal time,
   when the intensity of the received signal returns back to a desired level for permitting reproduction of an image from the signal after the one full turn, the receiving direction control signal output unit updates the direction in which the television broadcast signal is received at optimum and the maximum of the intensity of the received signal while modifying the threshold to a level determined from the updated maximum of the intensity for storage in the memory,
   then, whenever the intensity of the received signal at the channel drops down from the threshold and stays continuously below the threshold stored over the predetermined period of marginal time, the receiving direction control signal output unit controls the receiving direction control unit to fully turn the multi-directional antenna after the predetermined period of marginal time, and updates the direction in which the television broadcast signal is received at optimum, the maximum of the intensity of the received signal, and the threshold determined from the maximum of the intensity for storage in the memory, when the intensity of the received signal at the channel fails to return back to a desired level for permitting reproduction of an image from the signal, the receiving direction control signal output unit does not update the direction in which the television broadcast signal is received at optimum and the maximum of the intensity of the received signal.

* * * * *